INVENTOR.
MILES LOWELL EDWARDS

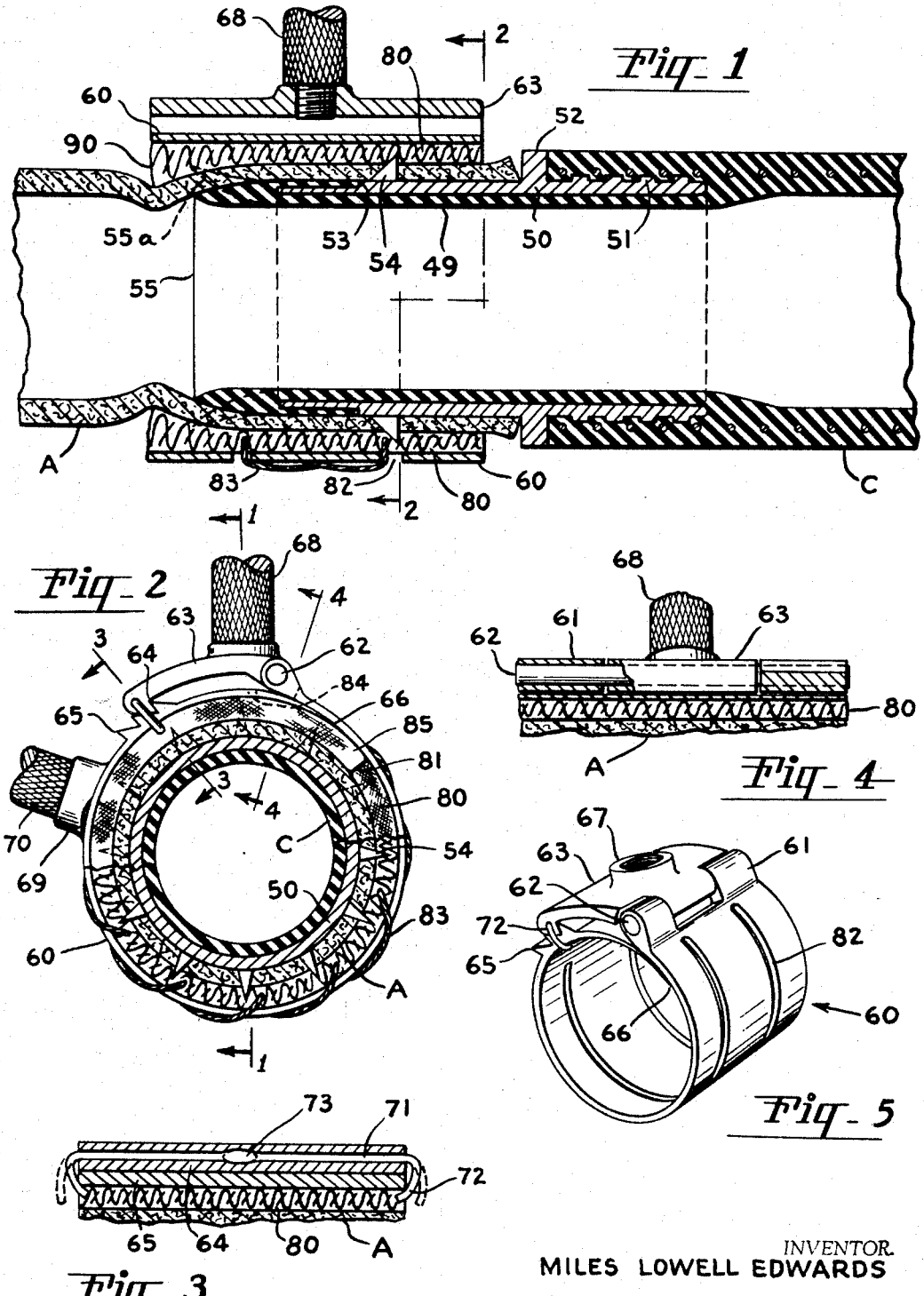

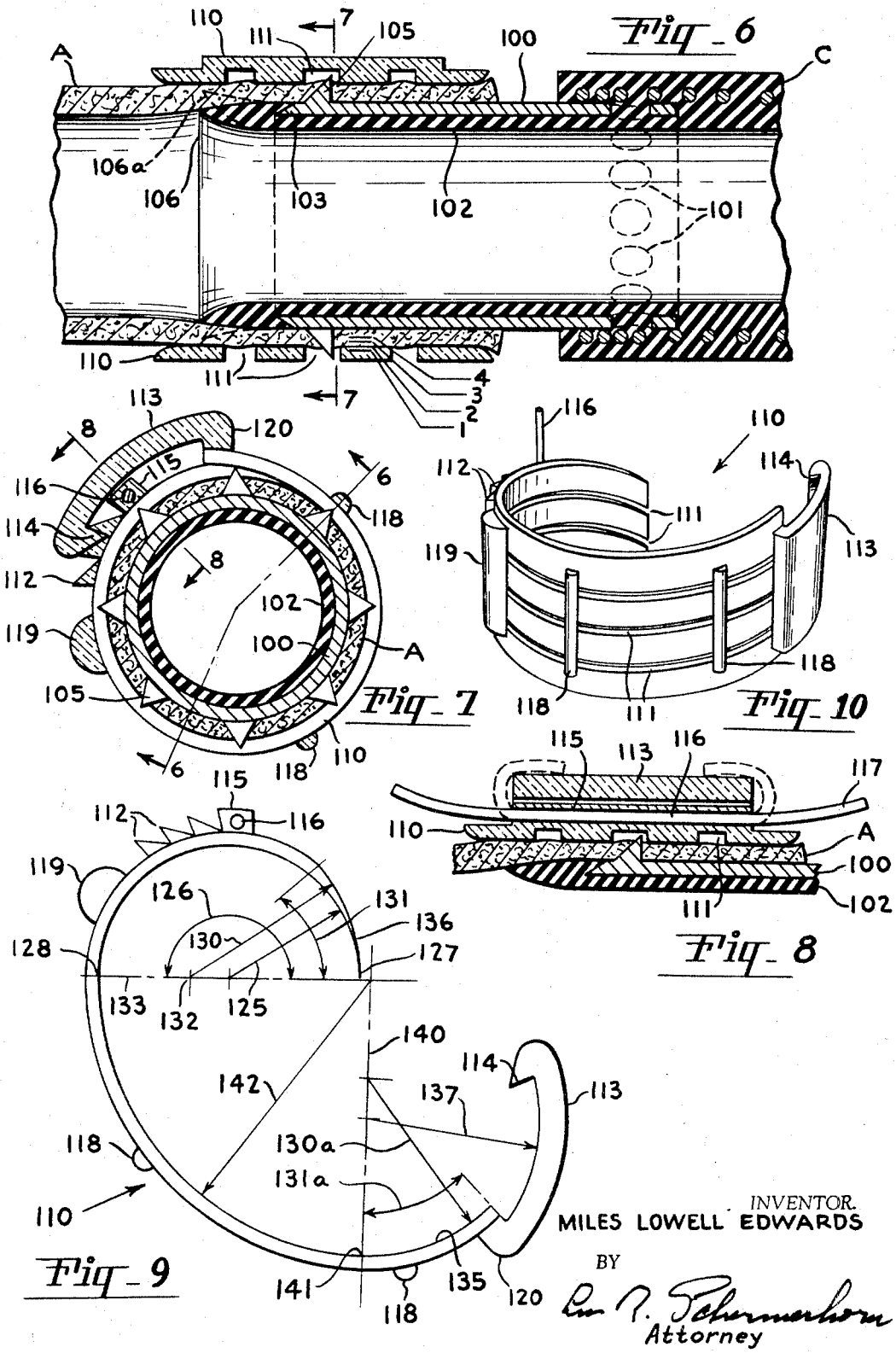

United States Patent Office 3,435,823
Patented Apr. 1, 1969

3,435,823
ANASTOMOTIC COUPLING WITH ANTI-PULSE RING MEANS
Miles Lowell Edwards, 13191 Sandhurst Place, Santa Ana, Calif. 92705
Filed Apr. 11, 1966, Ser. No. 541,815
Int. Cl. F16l 31/00
U.S. Cl. 128—334       21 Claims

ABSTRACT OF THE DISCLOSURE

Couplings are disclosed for connecting two graft tubes or a graft tube and a natural body vessel such as an artery. Each coupling comprises a rigid tube and a ring clamp. In the body vessel coupling the rigid tube has a silicone rubber lining with a flared projecting end portion which bears against the inner surface of the vessel and presses the wall of the vessel outwardly against the clamp to prevent the occurrence of a gap or crevice in the joint when the vessel expands from internal fluid pressure. The rigid tube has outwardly pointed projections to retain the body vessel and the ring clamp.

---

This invention relates to coupling devices for making connections with tubular vessels in the body.

The invention is of particular utility in the blood circulatory system and especially in connection with arterial grafts. When it is desired to replace or re-route some portion of the circulatory system, connections must be made with existing vessels and graft tubes may be necessary. It may also be necessary to make a connection between two graft tubes.

The general object of the invention is, therefore, to provide improvements in anastomotic couplings.

More particular objects are to provide improved couplings between graft tubes and natural vessels, improved couplings between two graft tubes and improved arterial couplings such substantially eliminate the conditions that tend to induce clotting of the blood. A further object is to provide couplings of the type described which can be made in very small dimensions for the small but vital cardiac arteries that supply the heart.

In making connection between a graft tube and an artery, for example, the coupling comprises a sleeve which extends into the end of the artery and graft tube, a clamp for securing the artery to one end of the sleeve and means for securing the graft tube to the opposite end of the sleeve. Preferably, the sleeve element is permanently incorporated into the graft tube. The invention further involves novel and improved forms of the clamp devices which secure the artery to the sleeve and a lining for a metal or hard plastic sleeve member which is less conducive to clot formation than the metal or hard plastic. The invention also includes a new and improved form of both sleeve and clamp device for connecting two graft tubes together.

The foregoing and other objects and advantages will become apparent and the invention will be better understood from the following detailed description of certain preferred embodiments illustrated in the accompanying drawings. Various changes may be made, however, in the details of construction and arrangement of parts and certain features may be used without others. All such modifications within the scope of the appended claims are included in the invention. The invention is not limited to couplings for use in the blood circulatory system but may be used in connection with any tubular vessels in the body.

Figure 12:
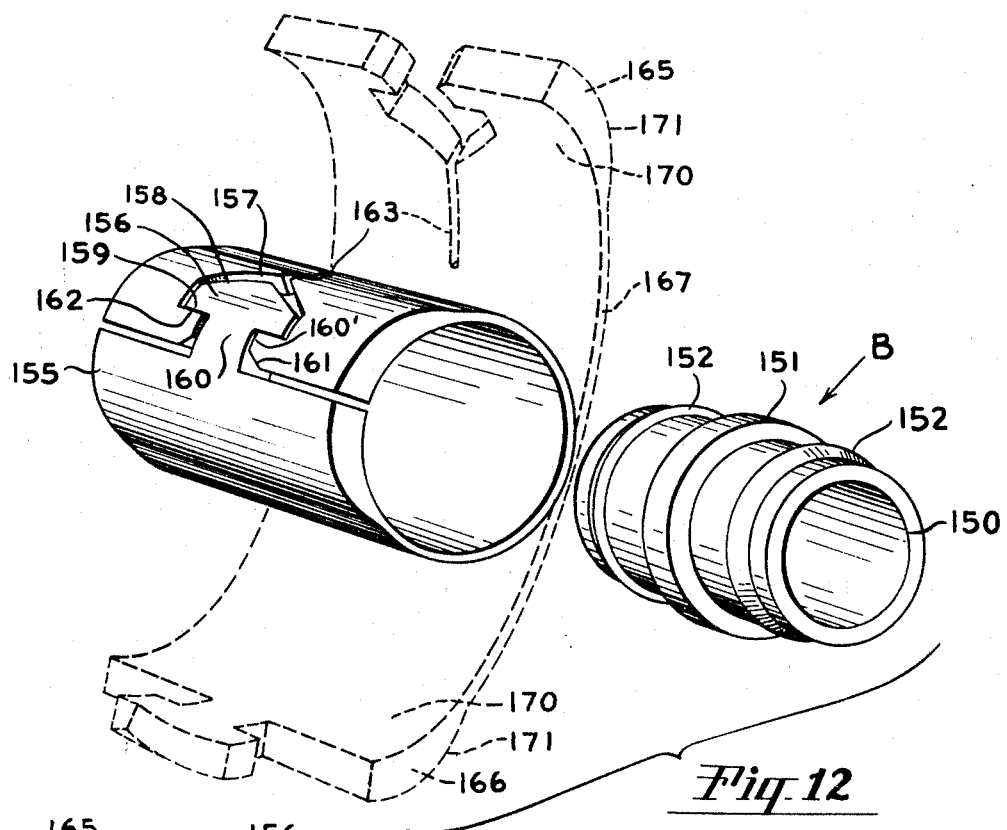
Figure 11:
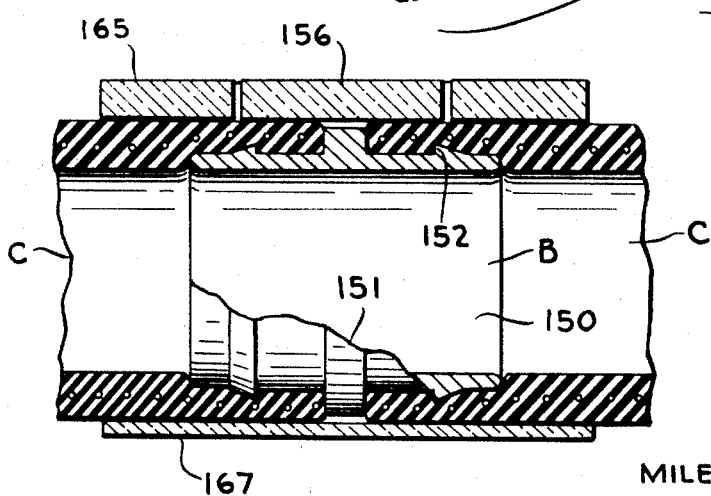

In the drawings:
FIGURE 1 is a longitudinal sectional view on the line 1—1 in FIGURE 2, showing a first embodiment of coupling for connecting a graft tube to a natural vessel;
FIGURE 2 is a cross sectional view on the line 2—2 in FIGURE 1;
FIGURE 3 is an enlarged view on the line 3—3 in FIGURE 2;
FIGURE 4 is an enlarged view on the line 4—4 in FIGURE 2;
FIGURE 5 is a perspective view of the clamp ring in FIGURE 1 with felt pad omitted;
FIGURE 6 is a longitudinal sectional view of a second embodiment of coupling for connecting a graft tube with a natural vessel, taken on the line 6—6 in FIGURE 7;
FIGURE 7 is a cross sectional view taken on the line 7—7 in FIGURE 6;
FIGURE 8 is an enlarged view taken on the line 8—8 in FIGURE 7;
FIGURE 9 is an end elevation view of the clamp member of FIGURE 6, showing its original configuration;
FIGURE 10 is a perspective view showing the original configuration of the clamp member;
FIGURE 11 is a longitudinal sectional view of a coupling for connecting the ends of two graft tubes; and
FIGURE 12 is an exploded perspective view of the sleeve and clamp members of the coupling in FIGURE 11 with the original configuration of the clamp member shown in broken lines.

Embodiment in FIGURES 1 to 5

In FIGURE 1, the silicone rubber graft tube C is equipped with an integral coupling for connection with artery A. For this purpose, an end of the tube C is molded to partially envelop a rigid sleeve tube 50 of suitable metal such as Stellite or a suitable hard and tough plastic. The tube 50 has an inner end equipped with circumferential ridges and grooves 51 to provide good retention in the rubber tube C and an outwardly projecting radial flange 52 abutting the end of the tube C on the outer surface of the sleeve.

The silicone rubber material of the tube C covers the entire inner surface of the sleeve tube 50 and provides a lining therefor at 49. At the outer end of sleeve tube 50, the lining material overlaps the outer surface of the sleeve tube back to a shoulder 53 adjacent a ring of outstanding barbed teeth 54 on the sleeve tube. The silicon rubber also projects a short distance beyond the end of the sleeve tube 50 where both inner and outer surfaces taper to a thin edge 55. This projecting end portion of the lining material is originally molded to a flaring shape as indicated in broken lines at 55a. The cut end of the artery is drawn over this sleeve as shown until the end of the artery abuts flange 52. To facilitate drawing the artery over the sleeve, the end of the artery may be slit longitudinally for a short distance.

Although a silicone rubber elastomer is preferred for the lining of sleeve tube 50, it is not necessary to make the whole graft tube of the same material. The main body of the graft tube may be made of a different plastic and silicone rubber placed in the mold in the region of sleeve tube 50 so that the two plastics will fuse and weld together as a single integral plastic body. Silicone rubber is desired for lining portions 49 and 55 because it has less tendency to induce clotting of blood than any other known material.

The artery is held on the coupling by clamp 60. The body of the clamp is molded of plastic as shown in FIGURE 5. Suitable plastics for this purpose are "Lexan," a polycarbonate, or "Teflon," a fluorocarbon. One end of the clamp is equipped with hinge lugs 61 for a hinge pin 62. The hinge pin carries a pivotal latch member 63 having a hooked end 64 to engage ratchet teeth 65 spaced a distance from the other end of the clamp band. This end of the clamp band tapers to a thin end 66 which is arranged to slide under the hinge end of the band.

Latch member 63 is equipped with a threaded boss 67 to receive a removable handle 68 and the other end portion of the clamp band is equipped with a similar boss 69 beyond the ratchet teeth to receive removable handle 70. Molded into the free end of latch member 63 is a stainless metal wire 71 having extending ends 72 which may be bent under the band to lock the latch member as shown. An intermediate portion of wire 71 is flattened at 73 to provide retention in the latch member.

Clamp 60 is formed in open shape as will be explained in connection with FIGURE 9.

The clamp is lined with a resilient Teflon felt pad 80 which has abutting ends at 81. The clamp band is circumferentially slotted at 82 from a point adjacent the hinge lugs 61 to a point adjacent the ratchet teeth 65. Throughout this arc of the clamp band, the pad 80 is secured to the band by Teflon thread 83 passing through the slots 82. Sewing holes 84 are also provided near the end 66. End portion 85 of the pad is left unsecured so that the ends of the clamp and pad may be spread apart for placing the clamp on the artery in FIGURE 1.

When the clamp is closed on the artery, end 85 of the felt pad and end 66 of the clamp band slide inside the portion of the clamp band adjacent hinge lugs 61 so that the band may be contracted on the artery. The desired degree of compression on the artery is obtained by drawing the handles 68 and 70 toward each other. This manipulation also tends to swing latch member 63 counterclockwise in FIGURE 2 about hinge pin 62, causing the hook end 64 to ratchet over the teeth and be engaged by one of the teeth when pressure on the handles is released. The ends of wire 71 are then secured as shown in FIGURE 3 and the handles 68 and 70 removed from the clamp. Barbs 54 are sufficiently long to penetrate through the artery wall and into pad 80 but are not long enough to encounter the clamp band itself. The barbs thereby provide retention to keep the clamp and artery from sliding off the end of the sleeve tube.

In applying the clamp, it is positioned longitudinally as shown in FIGURE 1 with one side of the clamp overhanging the end of the coupling. This contracts the flared end 55a of the silicone rubber to the position indicated at 55 and produces an inward circumferential bulge 90 in the edge of the pad 80 holding the artery wall firmly against the outer surface of the silicone rubber up to the very end of the rubber at 55 and preventing any gap between the rubber and the artery when the artery tends to expand with the pulse beat. This provides an anti-pulse ring to prevent the formation of a crevice, which would induce clotting of the blood, and maintains substantially streamlined flow through the transition from artery to graft tube.

Slots 82 provide openings for growth of tissue through the porous felt pad 80 and the clamp band to nourish the clamped portion of the artery wall and keep it vital and healthy.

*Embodiment in FIGURES 6 to 10*

FIGURES 6 to 10 show another type of coupling on the end of graft tube C to connect with artery A. The end of the graft tube is molded to partially envelop metal or hard plastic sleeve tube 100 which is provided with openings 101 for secure interlocking engagement with the graft tube. One portion of the graft tube overlies the end of sleeve 100 about the openings 101 and another portion 102 of the graft tube extends within the sleeve to form a lining.

Lining portion 102 extends beyond the outer end of sleeve tube 100 and interlocks therewith over the tapered end surface 103 of the sleeve tube. A short distance from this end the sleeve is equipped with a series of radial projections forming barbs 105. The outer extremity of lining portion 102 tapers to a thin edge at 106. This end portion is originally molded with a slight outward flare as shown in broken lines at 106a which has a diameter slightly larger than the outside diameter of sleeve tube 100. Although it is preferred to make lining portion 102 of silicone rubber, a different plastic may be used for the rest of the graft tube as mentioned in connection with FIGURE 1.

When the artery A is pulled over the end of the coupling, the flexible end portion 106a is contracted to a smaller diameter at 106 which is approximately equal to the inside diameter of sleeve tube 100. To facilitate drawing the end of the artery over the tube end 106a and barbs 105, the end of the artery may be slit longitudinally for a short distance.

The artery is secured on the end of the sleeve by plastic clamp 110. The clamp band is slotted circumferentially at 111 and the central one of the three slots is positioned over the ring of barbs 105, the barbs having sufficient length in a radial direction to project through the wall of the artery and into the central slot of the clamp band as shown. This provides retention for the clamp band to prevent it from pulling off the end of the sleeve. The clamp band has sufficient width to overhang the end 106 of lining material 102 and form an anti-pulse ring to hold the wall of the artery firmly against end 106 and prevent any crevice at the transition. The internal bevel on end portion at 106 provides a smooth contour in the transition from the artery to the tube lining 102.

Slots 111 provide openings for the growth of tissue through the band to nourish the clamped portion of the artery wall and keep it vital and healthy. After a time, such tissue envelops the clamp band until it is entirely encapsulated in scar tissue.

Clamp band 110 is equipped at one end with ratchet teeth 112 which bridge the slots 111. At its opposite end the clamp band is equipped with an integral latch member 113 having a hooked end 114 to engage and lock in one of the ratchet teeth 112. The first ratchet tooth 115 has molded therein a stainless wire 116 with projecting ends 117 that may be bent over the latch 113 to secure the latch as shown in broken lines in FIGURE 12. At intervals around the clamp band the slots 111 are also spanned by small bridge members 118 and a larger bridge member 119 to prevent distortion of the band. Slots 111 extend the full length of the band under ratchet teeth 112 and 115, bridge members 118 and 119 and the end portion of latch 113 which is offset from the band. Large bridge member 119 is closely adjacent the last ratchet tooth 112.

The large bridge member 119 and offset portion 120 of the latch provide lugs on opposite ends of the clamp band for drawing these ends together and constricting the clamp band to compress the wall of the artery against the sleeve. By engaging the hooked end 114 of the latch with a selected one of the ratchet teeth, the clamp may be adjusted to four different diameters as indicated by the indicia 1, 2, 3, 4 in FIGURE 6. The clamp may be adjusted to the amount of compression desired by the surgeon.

The clamp band is originally molded in the open shape shown in FIGURE 9. The inside surface of the ratchet end of the clamp band is molded to a cylindrical contour having a radius 125 equal to half the inside diameter of the band wherein such diameter is midway between the maximum and minimum values indicated at 1 and 4 in FIGURE 6. This constant radius is maintained throughout a 180° arc 126 which extends from the end of the clamp band at 127 to a point 128 behind the large bridge lug 119. Hence, this portion of the clamp band very closely fits the different adjustments provided by the four different ratchet teeth with almost negligible distortion of the band.

The extremity of the ratchet end of the band is tapered in thickness by forming it to a radius of slightly larger value than the radius 125 as indicated by the radius line 130. This radius is maintained throughout a small arc 131 extending from the end 127. The center 132 of the radius 130 is located on the diametrical line 133 which contains the center of radius 125. The remainder of the band is preferably of uniform thickness.

The opposite end portion of the band has its inside surface molded to cylindrical contour on a radius 130a which is the same as outside radius 130. Thus, the inside surface at 135 precisely fits the outside surface at 136 when the ends are overlapped as shown in FIGURE 7. Radius 130a is maintained throughout the arc 131a which has the same length as arc 131. Radius 130a may be slightly less than radius 130 but should not be larger.

The inside surface of latch 113 is molded to cylindrical contour having a radius 137 equal to the maximum outside radius dimension of the ratchet teeth so that this surface will fit over the ratchet teeth. The centers of radii 130a and 137 lie on a common line 140 which is perpendicular to the line 133.

The inside surface of the remainder of the band from point 128 to point 141 is molded to a cylindrical contour having a considerably larger radius 142 to separate the ends of the clamp band and hold the clamp in open position for convenient application to the artery. The center of radius 142 lies on the point of intersection of lines 133 and 140. This radius extends for 90° of arc between points 128 and 141 and has a value to produce a length of clamp band that will bend to the radius 125 when the latch is engaged with one of the intermediate ratchet teeth.

It is intended that this intermediate section of the clamp band between points 128 and 141 should undergo all of the bending when the clamp is applied and closed and that the portions included in arcs 126 and 131a should not bend. Arcuate portion 131a is rigidified to some extent by latch 113 and bridge member 118. There is very little tendency for arcuate portion 126 to bend in closing the clamp because when closing pressure is applied to bridge lug 119 the length of the band from end 127 to lug 119 is not under stress.

The purpose of locating the centers of all the radii 125, 130, 130a, 137 and 142 on the two perpendicular lines 133 and 140 is to facilitate manufacture. The clamp may be machined directly from a piece of plastic or a pattern may be machined for use in making a molded clamp. In either case, the machine operations are greatly simplified by locating all the centers on two lines at right angles to each other. By orienting lines 133 and 140 in the directions of movements of a slide and cross slide of a machine tool holding the work piece, the work piece may readily be shifted in one direction or the other to locate the centers of the different arcuate cuts. This is of particular advantage in making very small clamps.

When the clamp is closed as shown in FIGURE 7, there is no tendency for the hook end 14 of the latch to pull out of the ratchet teeth and release the clamp. The tension on latch member 113 is circumferential without any outward component whereby the latch tends to remain in engaged position and does not have to be held engaged until it is secured by the wire ends 117.

By making the right ends of the couplings in FIGURES 1 and 6 the same as the left ends, these couplings may be used for connecting together the severed ends of arteries or other natural tubular vessels in the body instead of making connection with a graft tube.

FIGURE 9 will also serve to illustrate the method of making clamp 60 in FIGURE 5. The end portions of the clamp band 60 are formed to the radii of the closed clamp as indicated at 125, 130a in FIGURE 9 while the intermediate portion of the band is formed to the longer radius 142.

Clamp 110 in FIGURES 9 and 10 may be equipped with a felt pad as at 80 in FIGURE 2, if desired.

*Embodiment in FIGURES 11 and 12*

FIGURES 11 and 12 show a coupling B for connecting two graft tubes C together. This coupling comprises a metal or hard plastic sleeve 150 having at mid length an outstanding flange 151 abutting the ends of the graft tubes. Intermediate flange 151 and each end of the tube is a sharp edged retention ridge 152 having a perpendicular face confronting the flange 151 and a sloping face on its opposite side. When the graft tubes are clamped on the sleeve, the ridges 152 bite into the tubes and prevent the tubes from slipping off the sleeve. The tubes C are secured by a clamp member 155 made of a suitable plastic, such as a polycarbonate or a fluorocarbon.

One end of the clamp band is provided with a T head 156 and the other end is provided with an opening 157 to engage and lock the T head. Head 156 has end surfaces 158 which taper to a point while the back side of the head provides locking edges 159 on opposite sides of a narrower neck portion 160. Opening 157 has a narrow entrance end 160′ flanked by bevelled surfaces 161 and locking edges 162. Extending a short distance around the band from opening 157, the band is slotted at 163.

When the tapered end 158 of head 156 is pressed against the angular surfaces 161, the slot 163 allows the narrow entrance neck portion 160 to yield and spread apart sufficiently for head 156 to pass therethrough and enter into opening 157 as shown. The walls on opposite sides of entrance portion 160′ then snap back together, presenting retention edges 162 against rear surfaces 159 of the head to lock the two ends together.

End portions 165 and 166 of the band are considerably thickened in relation to the intermediate portion 167 which comprises the major part of the length of the band. This provides increased stiffness for the interlocking parts and provides interlocking surfaces of greater radial depth at 159, 162 to prevent radial displacement of head 156 from opening 157. Also, for the same purpose the inside surfaces 170 of thickened portions 165 and 166 including head 156 are molded to the same radius of curvature as the outer surfaces of tubes C. In order to hold the clamp band open for convenient application, the thinner portion 167 is molded to a considerably larger radius, the molded configuration being shown in broken lines in FIGURE 16.

When the clamp band is applied to the coupling, the sloping back surfaces at 171 on thickened portion 165 and 166 provide abutments equivalent to lugs against which pressure may be applied to close the clamp band and lock its ends together. When pressure is applied at these points, the entire bending stress is exerted through the length of thinner portion 167, causing this portion to conform to the curvature of tubes C and bring the ends of the clamp band together. The parts are dimensioned to provide a tight clamping action when the clamp is locked, causing a slight stretching of the clamp band and a slight compression of the tube C. The tension thus existing in the clamp band is exerted in a circumferential direction perpendicular to the plane of flat locking surfaces 159, 162 to hold these surfaces securely in engagement with each other.

Having now described my invention and in what manner the same may be used, what I claim as new and desire to protect by Letters Patent is:

1. An anastomotic coupling comprising a rigid tube member, a circumferential clamp for clamping a natural body vessel on one end of said rigid tube member, a plastic graft tube connected with the opposite end of said rigid tube member, a lining of resilient plastic material integral with said graft tube covering the inner surface of said tube member, and an internal anti-pulse ring arranged to bear resiliently against the inner surface of said vessel and press the wall of the vessel outwardly against said clamp to prevent a gap occurring between said wall and said member when said vessel expands from internal fluid pressure, said anti-pulse ring comprising an extension of said lining material projecting beyond said one end of said member, said extension tapering to a thin edge and having a gradual outward flare which is contracted resiliently within said vessel when said clamp is applied.

2. A coupling as defined in claim 1, said tube member being made of metal and said plastic material being an elastomer.

3. A coupling as defined in claim 1, said lining material enveloping a portion of the outer surface of said tube member at said one end thereof.

4. A coupling as defined in claim 1, said tube member having openings through its wall for interlocking said lining material on the inner and outer surfaces of the tube member.

5. A coupling as defined in claim 1, including barbed projections on said tube member under said clamping arranged to secure said vessel and clamping means against longitudinal movement on said tube member.

6. A coupling as defined in claim 5, said clamp comprising a clamp band having a slot arranged to receive said projections.

7. An anastomotic coupling as defined in claim 1, said clamp comprising a clamp band, and means for securing opposite end portions of said band together in clamped position on said vessel and member, said end portions being formed to the curvatures assumed by said end portions in said clamped position, said band having a mid portion formed to less curvature than said end portions to hold said ends apart for application to said vessel and member.

8. The structure of claim 7 including lug means on said opposite end portions for bending said mid portion and drawing said end portions together about said vessel and member without substantial bending of said end portions.

9. The structure of claim 7, said end portions being thicker and stiffer than said mid portion.

10. The structure of claim 7, said end and mid portions of said band being formed to circular arcs and the centers of said arcs being located on two straight lines which are perpendicular to each other.

11. The structure of claim 7, said securing means comprising ratchet teeth on one of said end portions and a latch member on said opposite end portion arranged to engage said teeth.

12. The structure of claim 11, said latch member being an integral part of said band and having an offset portion providing lug means whereby the clamp may be grasped for closing and tightening the clamp.

13. The structure of claim 11, including retainer means arranged to hold said latch member in engagement with said ratchet teeth.

14. The structure of claim 7, said band having longitudinal slots extending substantially the full length of the band.

15. An anastomotic coupling as defined in claim 1, said clamp comprising a clamp band having longitudinal slots therein, ratchet teeth on one end of said band, a latch member on the opposite end of said band arranged to engage said teeth, and a retainer arranged to hold said latch member in engagement with said teeth.

16. The structure of claim 15, including two means whereby the clamp may be grasped for tightening the clamp and engaging said latch member with said ratchet teeth, one of said means being located on said latch member and the other of said means being located adjacent said ratchet teeth.

17. The structure of claim 16, said latch member being pivotally mounted on said band and said means comprising a pair of handles detachably mounted on said latch member and said band.

18. The structure of claim 16, said latch member being an integral part of said band, one of said means comprising an offset portion of said latch member and one of said means comprising a lug on said band.

19. The structure of claim 15, including a felt pad mounted on the clamping surface of said band.

20. A coupling as defined in claim 1, said clamp comprising a clamp band having ratchet teeth on one end and a latch member on its opposite end arranged to engage said teeth, and a retainer for holding said latch member in engagement with said teeth.

21. A prosthetic anastomotic device comprising a tube, at least the inner surface of a substantial length of said tube comprising a smooth elastic rubber-like material, an end section of said tube comprising mainly a short, thin-walled rigid tubular ring lined with said rubber-like material and having an external circumferential row of small outwardly pointed projections, the extreme end portion of said lining extending beyond said ring and having in its relaxed condition an outwardly flared, tapered edge; an attachable external ring adapted to surround said end section and having an internal circumferential recess therein for retention of said external ring by said pointed projections, said external ring by said pointed projections, said external ring having an internal circumferential face adapted to bear inwardly against and compress said outwardly flared, tapered edge; whereby a natural vessel may be passed over and around said short tubular ring and gently clamped between said pointed projections and said internal recess and wherein the lining of said natural vessel may be held in gentle outward compression without a gap or crevice between said natural lining and said tapered edge of said rubber-like lining.

References Cited

UNITED STATES PATENTS

| 234,799 | 11/1880 | Neely | 24—20 X |
| 1,808,094 | 6/1931 | Yackey | 285—149 X |
| 2,318,816 | 5/1943 | Tinnerman | 24—20 |
| 2,353,647 | 7/1944 | Carmichael | 128—346 |
| 2,374,541 | 4/1945 | Hartman | 24—20 |
| 2,464,653 | 3/1949 | Phipps | 24—16 X |
| 2,876,514 | 3/1959 | Murphy | 24—20 |
| 3,155,095 | 11/1964 | Brown | 128—334 |
| 3,221,746 | 12/1965 | Noble | 128—334 |
| 3,357,432 | 12/1967 | Sparks | 128—334 |

FOREIGN PATENTS

| 919,620 | 10/1954 | Germany. |
| 17,444 | 1905 | Great Britain. |

DALTON L. TRULUCK, *Primary Examiner.*

U.S. Cl. X.R.

128—346; 285—252, 398, 419, 149; 24—20, 24